United States Patent [19]

Beaumont

[11] E Re. 28,859

[45] Reissued June 15, 1976

[54] ROCK DRILL

[75] Inventor: Richard W. Beaumont, Dallas, Tex.

[73] Assignee: Joy Manufacturing Company, Pittsburgh, Pa.

[22] Filed: Oct. 1, 1973

[21] Appl. No.: 402,318

Related U.S. Patent Documents

Reissue of:

[64] Patent No.: 3,666,024
Issued: May 30, 1972
Appl. No.: 59,290
Filed: July 29, 1970

[52] U.S. Cl. ..... 173/105; 173/134
[51] Int. Cl.[2] ..... B25D 9/00
[58] Field of Search ..... 173/104, 105, 134–138

[56] References Cited

UNITED STATES PATENTS

| | | | |
|---|---|---|---|
| 3,082,741 | 3/1963 | Huffman | 173/134 |
| 3,154,153 | 10/1964 | Wilder et al. | 173/135 |
| 3,410,354 | 11/1968 | Sudnishnikov et al. | 173/135 |
| 3,456,744 | 7/1969 | Altschuler | 173/137 |

FOREIGN PATENTS OR APPLICATIONS

| | | | |
|---|---|---|---|
| 4,392 | 1910 | United Kingdom | 173/137 |
| 945,371 | 12/1963 | United Kingdom | 173/137 |
| 117,252 | 3/1957 | U.S.S.R. | 173/134 |

*Primary Examiner*—James A. Leppink

[57] ABSTRACT

Rock drills presently in use are generally of two basic types, namely, those drills which belong to the so-called "rifle bar rotation" class and other drills which can generally be classified as "independently rotated."

12 Claims, 5 Drawing Figures

INVENTOR.
RICHARD W. BEAUMONT

INVENTOR
RICHARD W. BEAUMONT

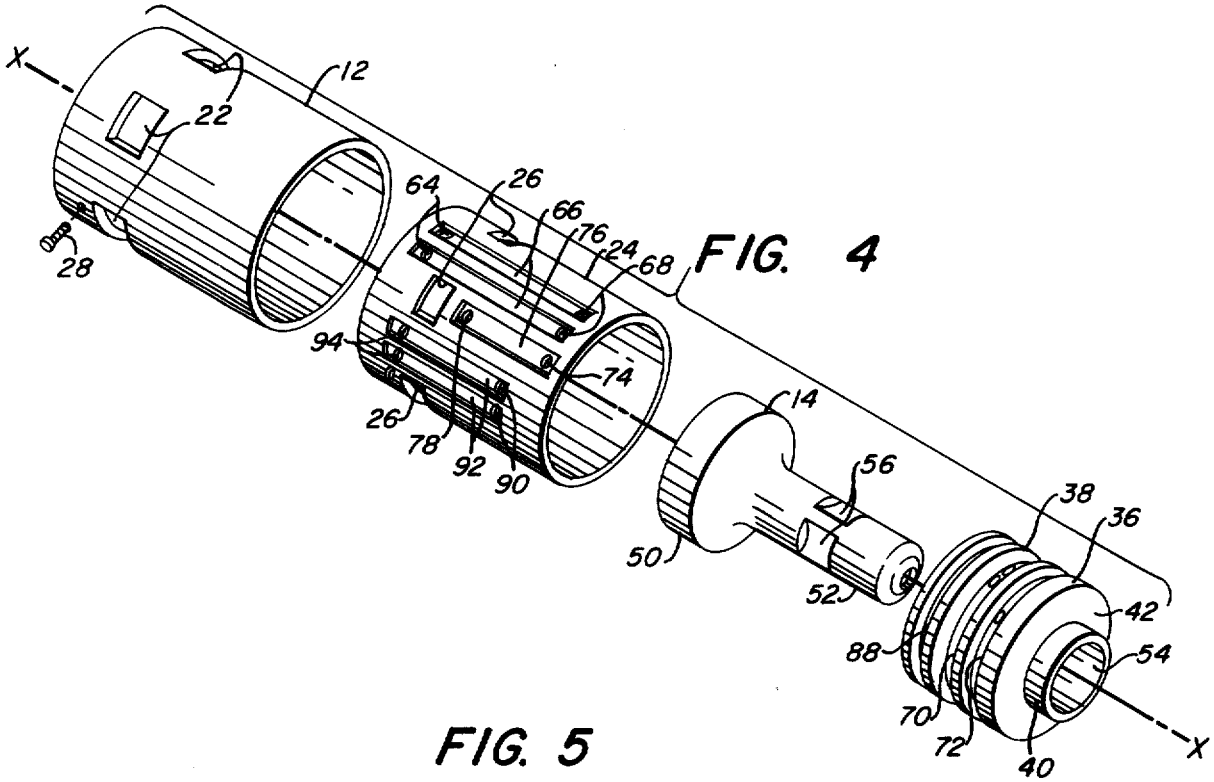
FIG. 4
FIG. 5
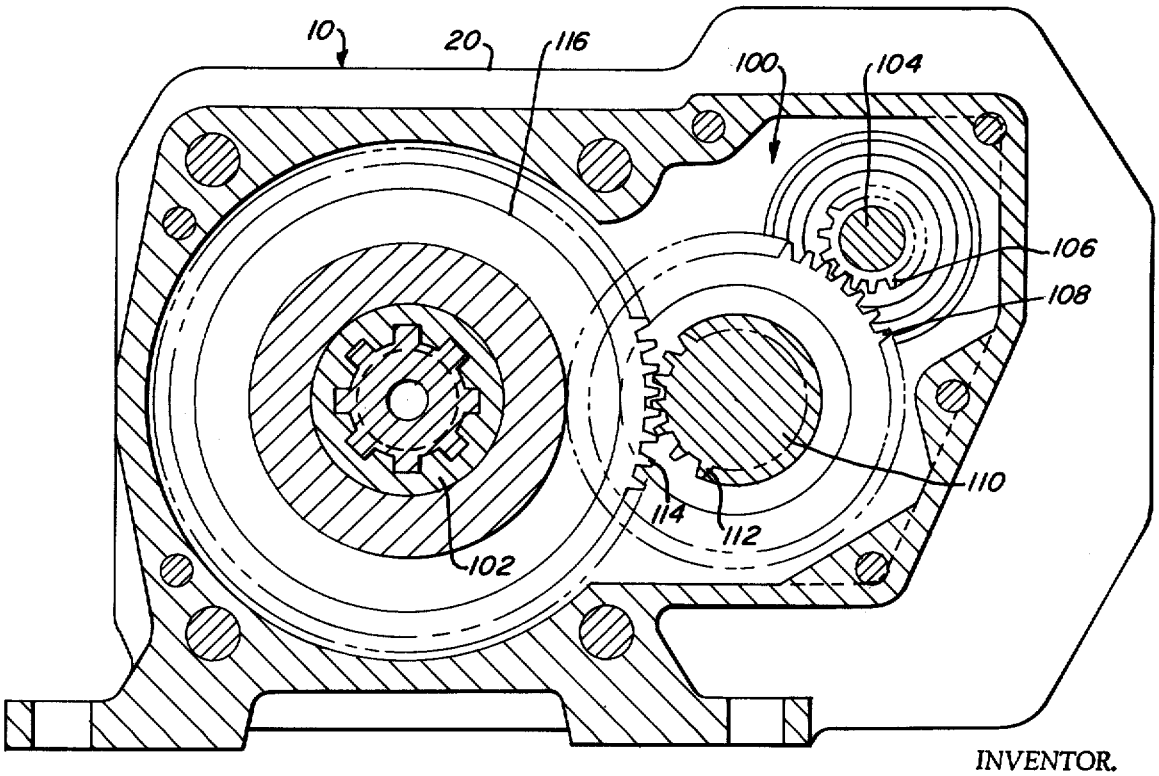
INVENTOR.
RICHARD W. BEAUMONT

ROCK DRILL

Matter enclosed in heavy brackets [ ] appears in the original patent but forms no part of this reissue specification; matter printed in italics indicates the additions made by reissue.

Rock drills presently in use are generally of two basic types, namely, those drills which belong to the so-called "rifle bar rotation" class and other drills which can generally be classified as "independently rotated."

Rock drills of the "rifle bar rotation" variety are well known by those skilled in the art and it will suffice to say that such drills are operable by a relatively complicated valving arrangement which provides actuation means to thrust a rifle bar forward to strike a piston head which in turn impacts upon a striking bar. Such rifle rotation rock drills have been widely accepted by industry in spite of obvious disadvantages, for example: the presence of expensive high wear parts such as the rifle bar, rifle nut, pawls, springs and plungers; and the relatively high degree of operator skill and experience required to uncouple and couple drill steels without stripping threads because, unlike an independent rotation drill, the hammer must be actuated while rotating.

In an effort to improve upon the basic rock drill rotating mechanism while overcoming disadvantages of the rifle bar rotating mechanism as discussed hereinabove some manufacturers have developed the so called "independent rotation" rock drill by adding an air motor with suitable gearing to more or less conventional kicker port valve operated percussion hammers thereby decreasing the number of moving parts while simultaneously relieving the amount of operator skill and experience required to couple and uncouple the drill steel because the hammer need not be actuated while rotating.

The present invention is classified as an independent rotation rock drill and includes a simple rugged, valveless cycle, with the piston being the only moving hammer part. Because of the valveless cycle the rock drill of this invention offers decided advantages over prior art independently rotated rock drills discussed hereinabove, for example: greater air efficiency; less expensive maintenance because it does not use an independent valve; and a higher frequency blow cycle which allows for a relatively low blow impact on the drill steel and also a short stroke large bore arrangement which can generally be said to be more efficient than prior independent rotation rock drills.

An additional feature of the present invention is the use of tapered roller bearing intermediates rotating chuck parts and the stationary rock drill body thereby substantially reducing thrust and radial drag.

These and other objects and advantages will become more readily apparent upon a reading of the following description and drawings in which:

FIG. 4 is an exploded perspective view of the piston motor embodying the principles of the present invention; and FIG. 5 is a cross-sectional view taken on line 5—5 of FIG. 1 and which shows a portion of the independent drill steel rotating mechanism.

Figure 1:
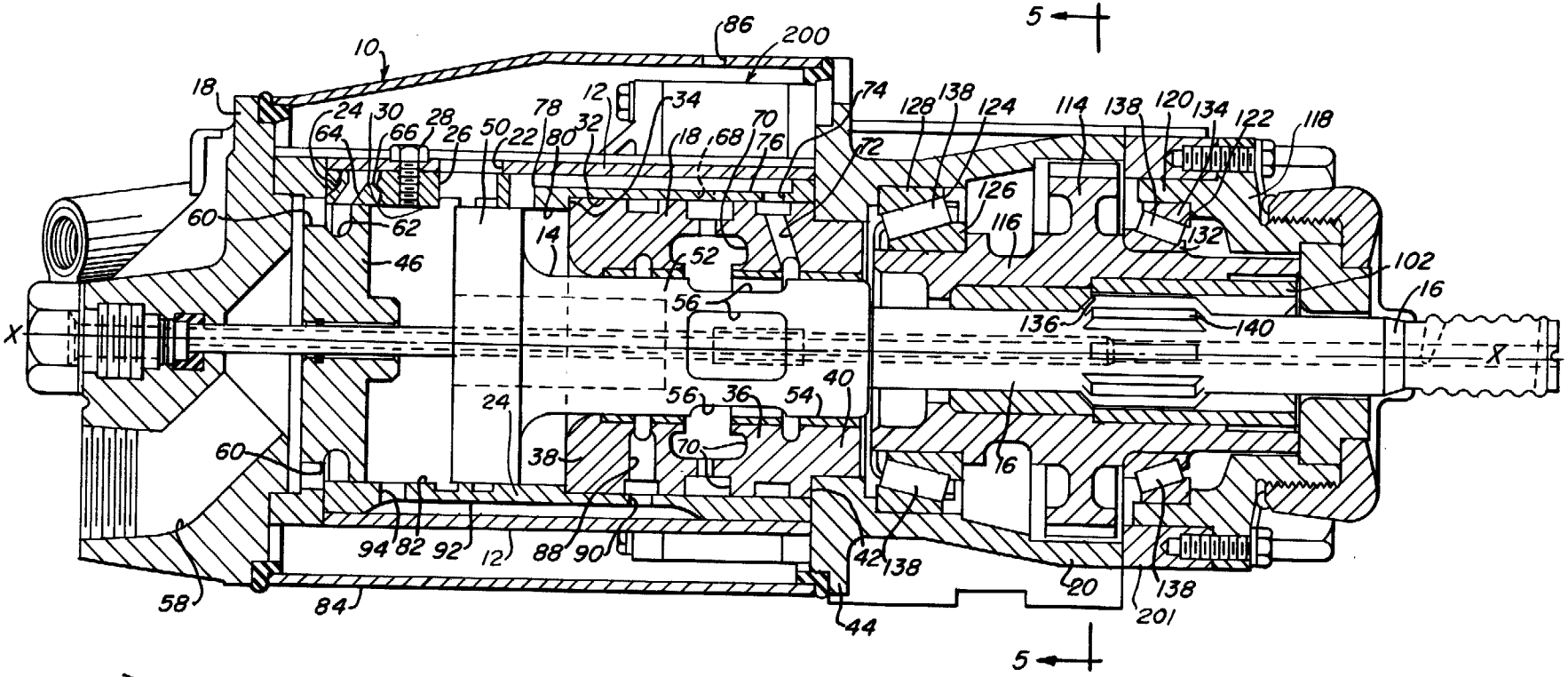
FIG. 1 is a central longitudinal vertical section through a rock drill embodying the principles of the present invention and showing the piston head at the striking or downstroke position thereof.

An elongated and pneumatically powered rock drill 10 embodying the principles of this invention comprises an elongated annular motor cylinder 12 which axially receives a stepped cylindrical piston head therewith for delivering impact loads to a striking bar 16 which is suitably adapted to carry a drill steel (not shown). The motor cylinder 12 is disposed intermediate a backhead or casing head 18 and a front or forward yoke 20. Cylinder 12, piston head 14, casing head 18 and yoke 20 are generally coaxial with respect to a longitudinal axis X—X of rock drill 10.

A plurality of circumferentially spaced exhaust portals 22, FIG. 4, extend radially through cylinder 12 intermediate the axial ends thereof. An elongated annular motor cylinder lining 24, having an outer diameter thereof substantially equal to the inner diameter of cylinder 12, is axially received within the interior of cylinder 12 and oriented such that the axial ends thereof are in approximate transverse alignment with respective axial ends of cylinder 12. Liner 24 additionally has a plurality of circumferentially spaced exhaust portals 26 which extend radially therethrough intermediate the axial ends thereof and when liner 24 is received and aligned within cylinder 12, portals 26 are in open communication with respective portals 22 of cylinder 12. The above described alignment of liner 24 within cylinder 12 is retained in any suitable manner, for example, a plurality of radially inwardly extending set screws 28 which engagingly communicate between liner 24 and cylinder 12.

Liner 24 is of an internally stepped cylindrical shape which has a constant outer diameter and includes a rear inner surface portion 30 and an increased inner diameter forward inner surface portion 32. An annular interior shoulder 34 is formed where portions 30 and 32 meet intermediate the axial ends of liner 24. A stepped cylindrical buffer ring 36 which includes a rearward portion 38 having an outer diameter thereof substantially equal to the inner diameter of liner portion 32 is coaxially received within portion 32 such that the rearwardmost end thereof engages shoulder 34 and the forwardmost end of portion 38 is transversely aligned with a forwardmost end of portion 32. A forward portion 40 of buffer ring 36 has an outer diameter thereof less than the outer diameter of portion 38 that extends axially and forwardly from the forwardmost end of portion 38.

An exterior shoulder 42 is formed at the intersection of portions 38 and 40. The hollow forwardly extending yoke 20 includes a flange 44 at the rearward end thereof which has an inner diameter thereof substantially equal to the outer diameter of buffer ring portion 36 and as such, flange 44, engages shoulder 42 and the forward ends of cylinder 12 and liner 24 thereby retaining buffer ring 36, cylinder 12 and liner 24 in the above described relative positions.

A disc shaped supporting ring 46 having an outer diameter thereof shown as equal to the outer diameter of motor cylinder 12 is coaxially disposed intermediate the rearward end of cylinder 12 and the forward end of back head 18. With supporting ring 46 positioned as described above, the travel of piston head 14 is limited to that distance between the forwardmost end of ring 46 and the rearwardmost end of buffer ring 36.

Figure 3:
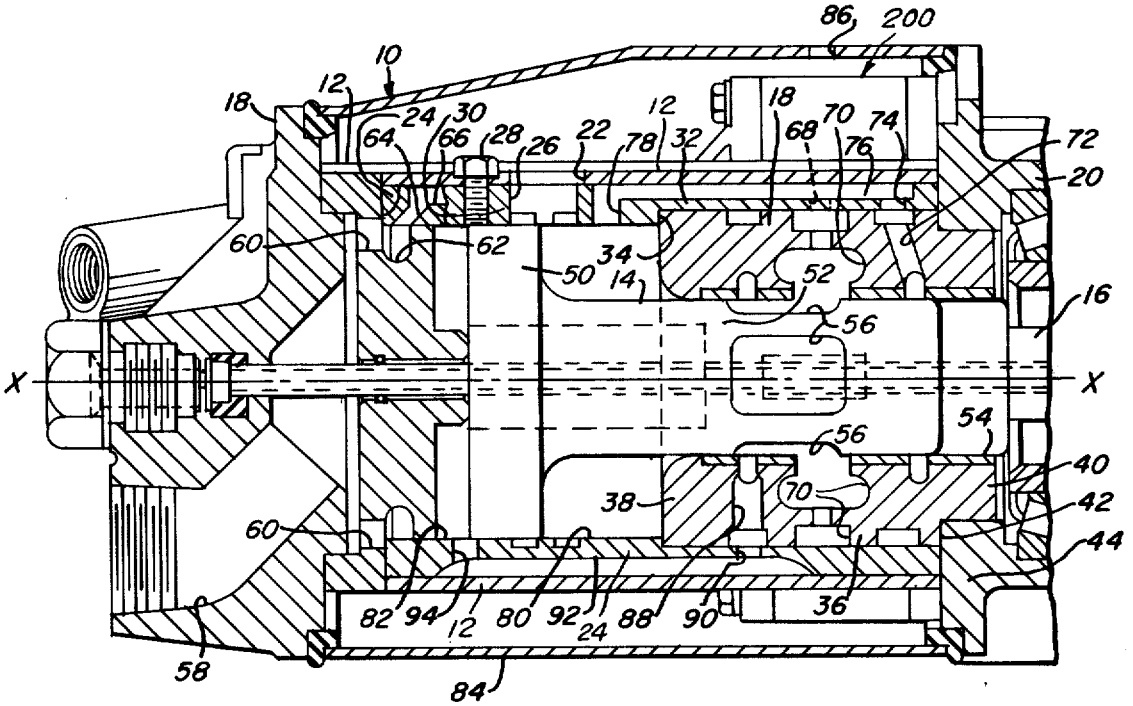
FIG. 3 is a portion of the central longitudinal vertical section of FIG. 1 wherein the piston head is in the upstroke position thereof.

Piston 14 comprises a head portion 50 having an outer diameter thereof substantially equal to the inner diameter of the rear portion 30 of liner 24 and an elongated reduced diameter stem 52 which extends coaxially forwardly from piston head portion 50. Piston 14 is slidably received within liner 24 and the stem 52 thereof is slidably received within a coaxial through bore 54 which extends axially through buffer ring 36. Stem 52 has a plurality of circumferentially aligned and spaced outwardly open, flat bottom grooves 56 about the outer periphery and intermediate the axial ends thereof. As shown in FIGS. 3 and 4, grooves 56 have a generally rectangular cross section with the long sides thereof extending generally parallel to the longitudinal axis X—X of rock drill 10.

A pneumatic fluid pressure source (not shown) provides a supply of pneumatic pressure fluid, such as air, to rock drill 10. To retract the piston head 14 from the down stroke or impact position thereof, that is the position as illustrated in FIG. 1 wherein piston 14 is in engagement with the rear end of striking bar 16, pressurized air flows: from the source; through a passageway 58 in back head 18 communicating between the rearward and forward ends thereof; through a plurality of bores 60 which are circumferentially spaced about support ring 46 and inwardly spaced from the outer periphery thereof and open into an outwardly open peripheral groove 62 in a forward end portion of ring 46; through groove 62; and through a plurality of passageways 64 which communicate between groove 62 and respective ones of a plurality of liner passageways 66. Liner passageways 66 are shown as radially outwardly open circumferentially spaced grooves which extend axially along the outer periphery of liner 24 generally parallel to axis X—X. The forward ends of passageways 66 terminate intermediate the axial ends of the forward portion 32 of liner 24, see also FIG. 4. The pressurized air flows through passageway 66 and into respective radial passageways 68. Passageway 68 extend radially inwardly from the forward ends of respective passageway 66 and open into a passageway 70 in buffer ring 36 comprising interconnected inner and outer peripheral grooves thereof. The pressurized air flows; through passageway 66; through passageways 68; through passageway 70 and into the grooves 56 about the outer periphery of stem 52.

Spaced axially forwardly from passageway 70, a passageway 72 comprising inner and outer peripheral grooves in buffer ring 36 also communicates between the inner and outer periphery thereof. When piston 14 is in the down stroke or impact position discussed hereinabove, passageways 70 and 72 register with grooves 56 adjacent the rearward and forward ends thereof respectively. The pressurized air from passageway 70 flows: through grooves 56; through passageway 72; and through a plurality of radial extending passageways 74 in liner 24 communicating between the inner periphery thereof and the forward end of respective ones of a plurality of liner passageways 76. Liner passageways 76 are shown as radially outwardly open circumferentially spaced grooves which extend axially along the outer periphery of liner 24 generally parallel to the axis X—X. The rearward ends of the passageways 76 terminate axially intermediate the forward axial end of rear portion 30 of liner 24 and exhaust portals 26.

A plurality of radially inwardly extending passageways 78 in liner 24 communicate between respective liner passageways 76 adjacent the rearward ends thereof, and the inner periphery of liner 24. With piston 14 in the downstroke or impact position (FIG. 1) passageway 78 opens into a retracting chamber portion 80 which is defined by and comprises that area between the inside diameter of liner 24 and the outside diameter of stem 52 and between the piston head portion 50 and the rearward end of buffer ring 36. Pressurized air flows from liner passageway 76; through passageways 78 and into retracting chamber 80 whereat such pressurized air reacts against the forward annular surface of piston head 50, and accordingly, urges the piston 14 rearwardly to the position shown in FIG. 3.

During the initial portion of the upstroke travel of piston head 14 an impact chamber 82, which is defined by and comprises that area of the inner periphery of liner 24 axially intermediate the rearward end of piston head 14 and the forward surface of supporting ring 46, is in open communication with the aligned exhaust portals 22 and 26 and as such the pressure within chamber portion 82 during such initial upstroke travel is substantially atmospheric. The term substantially atmospheric is used herein for portals 22 and 26 exhaust into an encompassing muffler assembly 84 and a slight back pressure somewhat higher than atmospheric will exist within muffler assembly 84. Assembly 84 is opened to atmosphere at portions 86 spaced above the periphery theref. The air within impact chamber 82 will exhaust through portals 22 and 26 for the portion of the upstroke travel of piston head 14 which maintains open communication between portals 22 and 26 and chamber 82.

Figure 2:
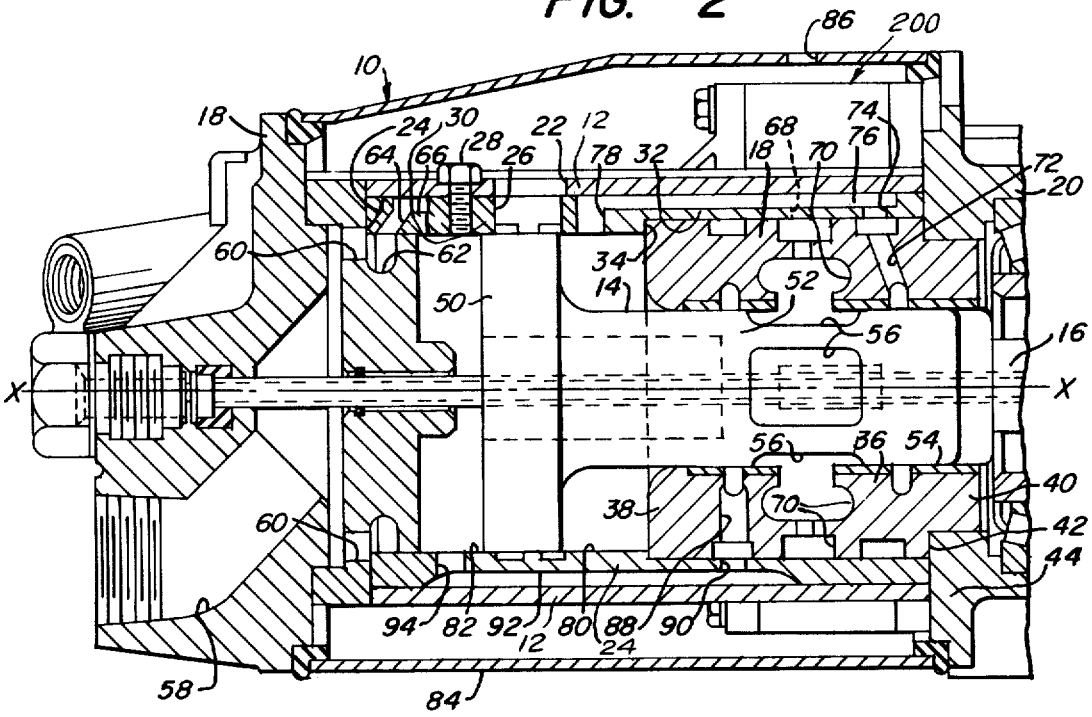
FIG. 2 is a portion of the central longitudinal vertical section of FIG. 1 wherein the piston head is in the intermediate cyclic position thereof.

FIG. 2 illustrates the operation of the impact motor when piston head 14 is in a position intermediate the upstroke and downstroke position thereof. In the intermediate piston head position, stem grooves 56 are no longer in communication with passageway 72 and, the flow of pressurized air passageways 74, 76 and 78 and eventually into retracting chamber 80 is discontinued. The open communication between impact chamber 82 and portals 22 and 26 is also discontinued by the outer periphery of piston head portion 50 covering portals 26. Chamber 80 and the passageways leading thereto comprises a substantially isolated system and accordingly the pressurized air within chamber 80 begins to expand and as such continues to apply pressure to the forward annular surface of piston portion 50 thereby maintaining the rearward or upstroke movement thereof. Upon such continued upstroke the air within chamber 82, which chamber 82 also comprises a substantially isolated system, compresses and offers a resistance to the upstroke movement of the piston head 14. The expansion of the air within chamber 80 coupled with the upstroke momentum imparted to piston head 14 when passageway 72 was still in communication with the fluid pressure source, will provide an upstroke force to piston head 14 greater than the resistance present by the compression of air within chamber 82, thereby forcing piston head 14 to the full upstroke position thereof as illustrated in FIG. 3. The resistance offered by the compression of air within chamber 82 offers an instantaneous rebound force to aid in the downstroke travel of piston head 14 as hereinafter described.

FIG. 3 illustrates the orientation of piston head 14 in the upstroke or retracted position thereof. In such upstroke position, passageway 70 is in open communication with grooves 56 adjacent the forward ends thereof. A double groove and communicating bore passageway 88 in buffer ring 36 which is spaced axially rearwardly of passageway 70 communicates between the inner and outer periphery of ring 36. When piston head 14 is in the upstroke position passageway 88 is in open communication with grooves 56 adjacent the rearward ends thereof.

To move the piston head 14 from the retracted or upstroke position thereof into impact engagement with the striking bar 16, pressurized air flows: through passageway 70; through passageway 88; and through a plurality of passageways 90 in liner 24 which communicate between passageway 88 and respective ones of a plurality of liner passageways 92 adjacent the forward ends of passageways 92. Liner passageways 92 as shown comprise radially outwardly open circumferentially spaced grooves which extend axially along the outer periphery of liner 24 generally parallel to axis X—X.

A plurality of radially extending passageways 94 in liner 24 communicate between respective liner passageways 92, adjacent the rearward ends thereof and axially intermediate the forward end of supporting ring 46 and exhaust portals 26, and the inner periphery of liner 24 (chamber portion 82). With piston 14 in the upstroke position (FIG. 3) passageways 94 are in open communication with the impact chamber 82. Pressurized air flows through grooves 56, passageways 92, and through bores 94 into impact chamber 82 whereat such pressurized air reacts against the rearward surface of piston head portion 50 and, accordingly, urge piston 14 forwardly into impact with striking bars 16.

During the initial portion of the downstroke travel of piston 14 the retract chamber 80 is in open communication with aligned exhaust portals 22 and 26 and as such the pressure within chamber 80 during such initial downstroke travel is substantially atmospheric. The air within retracting chamber 80 will exhaust through portals 22 and 26 for the portion of the downstroke travel of piston head 14 which maintains open communication between portals 22 and 26 and chamber 80.

When piston head 14 is an intermediate position (FIG. 2) during the downstroke cycle thereof, grooves 26 are no longer in communication with passageway 90 and, as such, the flow of pressurized air therethrough and eventually into impact chamber 82 is discontinued. The open communication between retracting chamber 80 and portals 22 and 26 is also discontinued by the outer periphery of piston head portion 50 registering radially adjacent portals 26. The pressurized air within chamber 82 begins to expand, and, as such, continues to apply pressure to the rearward surface of piston head portion 50 thereby maintaining the forward or downstroke movement thereof. Upon such continued downstroke movement the air within chamber 80 compresses and offers a resistance to the downstroke movement of the piston head 50. The expansion of the air within chamber 82 coupled with the downstroke momentum imparted to piston head 50 when passageway 90 was still in communication with the fluid pressure source will provide a downstroke force to piston head 50 greater than the resistance present by the compression of air within chamber 80, thereby forcing piston 14 into the full downstroke position thereof, that is, into impact with striking bar 16. The resistance offered by the compression of air within chamber 80 eventually decreases the force with which piston head 14 strikes striking bar 16, however, the pressure within chamber 80 offers an instantaneous rebound force to aid in the upstroke travel of piston 14 as hereinbefore described.

It is to be noted that in the embodiment of rock drill 10 discussed hereinabove it is contemplated that grooves 56 will be in open communication with passageway 70 throughout the entire cyclic motion of piston head 14; that is, grooves 56 will be in communication with passageway 70 even at the extreme upstroke or downstroke positions of piston head 14. It is herein noted that although the described preferred embodiment contemplates such communication, the rock drill assembly 10 of this invention will still function properly if grooves 56 do not communicate with passageway 70 at one or both of the extreme positions of piston head 14 for built up pressure within respective chambers 80 and 82 will provide a rebound force sufficient to urge piston head 14 from the extreme position thereof until communication between grooves 56 and passageway 70 can be reestablished.

It is to be additionally noted that inasmuch as seals are not provided between chambers 80 and 82 and the various passageways within the rock drill 10 a slight amount of air leakage will occur between respective chambers and/or passageways, however such air leakage will not effect the operational characteristics to any great amount. If conditions dictate that air leakage between chambers and/or passageways be stopped, suitable seal rings or the like can be installed to prevent such leakage.

Striking bar 16 is rotated by a suitable independent motor rotation assembly 100 which is carried within an expanded portion of yoke 20 as shown in FIG. 5.

A drive between the independent rotation motor (not shown) and a rotatable chuck driver 102 may assume various forms but herein for illustrative purposes, the motor rotor (not shown) rotatably drives a shaft 104 which is suitably journaled within yoke 20. Secured to the shaft 104 is a spur pinion gear 106 meshing with a spur gear 108 carried on a shaft 110 which is also suitably journaled within yoke 20. Also carried by shaft 110 is a spur gear 112 meshing with teeth of a chuck driver gear 114. Driver gear 114 is suitably secured to a portion of the outer periphery of an elongated hollow driver shaft 116 intermediate the axial ends of shaft 116. Driver shaft 116 is received within the interior of yoke 20 coaxial with respect to axis X—X of rock drill 10.

A forward end cap bushing assembly 118 is suitably releasably secured to rock drill 10 adjacent the forward ends thereof and captively retains driver shaft 116 within the interior of yoke 20. A bearing support portion 120 of assembly 118 has the outer periphery thereof in engagement with the inner periphery of a forward end portion of yoke 20 and has the inner periphery thereof spaced radially outwardly from the outer periphery of driver shaft 116.

Driver shaft 16 is rotatably supported within the interior of yoke 20 by means of forward and rearward annular thrust bearings 122 and 124 respectively. Thrust bearing 124 is captively received intermediate the inner periphery of yoke 20 and the outer periphery of driver shaft 116 and comprises an annular race 126 which has the inner periphery thereof seated on the outer periphery of shaft 116 adjacent the rearward axial end thereof and an outer race 128 which has the outer periphery thereof seated upon a portion of the inner periphery of yoke 20 spaced radially outwardly from race 26. Thrust bearing 122 is captively received intermediate the inner periphery of yoke 20 and the outer periphery of bearing support portion 120 and comprises an inner race 132 which has the inner periphery thereof seated on the outer periphery of drive shaft 116 forwardly adjacent chuck driver gear 114 and an outer race 134 which has the outer periphery thereof seated upon a rear section of the inner periphery of bearing support portion 120 spaced radially outwardly from race 132. A plurality of tapered roller bearings 138 are captively disposed intermediate respective races of thrust bearings 122 and 124 thereby enabling the yoke 20 to rotatably carry the chuck elements therewithin.

Driver shaft 116 has an internal shoulder 136 intermediate the axial ends thereof. The annular chuck driver 102 is received within the interior of shaft 116 such that the rearward end thereof engages shoulder 136 and the forward end thereof is radially adjacent the forward end of shaft 116. Assembly 120 retains chuck driver 102 within the interior of shaft 116. Chuck driver 102 is rotatable with shaft 116 in any suitable manner, for example cooperating splines on respective adjacent peripheries thereof. Chuck driver 102 has interior lugs engaging the usually radially outwardly extending lugs 138 on the striking bar 16 whereby the bar 16 will rotate with chuck driver 102 as the striking bar is percussively actuated by the reciprocating piston head 14.

With an arrangement of elements as described above, wherein thrust bearings 122 and 124 are disposed intermediate rotating and non-rotating elements, at least a portion of the thrust and/or transverse forces imparted to the striking bar 10 are dissipated throughout the rock drill 10 because the thrust bearings operate to transfer such force from rotating to non-rotating portions of the rock drill assembly. Additionally, the presence of roller bearings 138 between rotating and non-rotating elements of rock drill 10 substantially reduces radial drag which would be present if adjacent member surfaces were in rotatable engagement. The dissipation of forces throughout the rock drill 10 and the reduction of radial drag results in obvious advantages such as longer striking bar life; more efficient use of energy by avoiding dissipation thereof through radial drag; better performance characteristics; and the like.

Inasmuch as the invention herein resides in the means of operating a rock drill without an independent valving system and wherein a piston is the only moving hammer part, various modifications can be made to the preferred embodiment described hereinabove without departing from the scope of the invention, for example: various passageways can be made as bores rather than the grooves as described and vice versa; the plurality of grooves 56 about stem 52 can be replaced by a continuous annular groove about a portion of the outer periphery of stem 52; the particular placement of the various passageways and the like can be altered; passageways and the like can be altered as structural alterations to the elements of rock drill 10 allow; the forward thrust bearing 122 can be captively received intermediate the inner periphery of yoke 20 and the outer periphery of driver shaft 116 forwardly of chuck driver gear 114 assuming bearing support portion 120 is altered such that the rearward end thereof is forwardly of bearing 122; and the like.

What is claimed is:

[1. In a rock drill, the combination comprising: an elongated body member having a chamber extending longitudinally therein; a hammer piston reciprocable within said chamber for percussively actuating a striking bar upon movement of said piston from a first portion of said chamber to a second portion of said chamber; first passageway means in said body member adapted to be connected to a fluid pressure source; second passageway means in said hammer piston in constant open communication with said first passageway means during at least a major portion of the reciprocable travel of said piston; third passageway means in said body member openly communicating between said second passageway means and a piston impact portion of said chamber only when said piston is moving through said first portion of said chamber; and fourth passageway means in said body member openly communicating between said second passageway means and a piston retracting portion of said chamber only when said piston is moving through said second portion of said chamber. ]

2. A rock drill as specified in claim [1] *11* wherein chamber exhaust means in said body member openly communicate between the exterior of said body member and said piston impact chamber portion at least when said piston is moving through said second portion of said chamber; and when said piston is moving through said first portion of said chamber said last mentioned open communication is discontinued by said piston.

3. A rock drill as specified in claim [1] *11* wherein chamber exhaust means in said body member openly communicate between the exterior of said body member and said piston retract chamber portion at least when said piston is moving through said first portion of said chamber; and when said piston is moving through said second portion of said chamber said last mentioned open communication is discontinued by said piston.

4. A rock drill as specified in claim 2 wherein said chamber exhaust means additionally communicate between the exterior of said body member and said piston retract portion at least when said piston is moving through said first portion of said chamber and when said piston is moving through said second portion of said chamber said last mentioned open communication is discontinued by said piston.

5. A rock drill as specified in claim [1] *11* comprising: rotation means in said body member for rotating said striking bar during percussive actuation; and thrust bearing means disposed intermediate a stationary portion of said body member and a rotatable portion of said rotation means for the rotatable carrying of said rotatable portion within said body member.

6. A rock drill as specified in claim [1] *11* wherein said second passageway means is in constant communication with said first passageway means during the entire reciprocable travel of said piston.

[7. A rock drill as specified in claim 1 wherein said hammer piston comprises a head portion and a reduced diameter stem portion; said head portion being of a diameter substantially equal to the diameter of said first and second portion of said chamber; and said second passageway means being in said stem portion. ]

8. A rock drill as specified in claim [1] *11* wherein a portion of said hammer piston blocks communication of said piston impact and retracting portions of said chamber with said fluid pressure source when said piston is moving through a central portion of said chamber between said second and said first portions of said chamber.

9. A rock drill as specified in claim 8 [wherein said hammer piston comprises a head portion and a reduced diameter stem portion;] *with* said head portion being of a diameter substantially equal to the diameter of said first and second portions of said chamber. [ and said second passageway means being in said stem portion ]

10. A rock drill as specified in claim 9 wherein chamber exhaust means in said body member openly communicate between the exterior of said body member and said piston impact portion at least when said piston is moving through said second portion of said chamber and openly communicate between the exterior of said body member and said piston retract portion at least when said piston is moving through said first portion of said chamber; and when said piston is moving through said first and second portions of said chamber discontinuing, by said piston, said open communication of said impact and retract portions respectively.

*11. In a rock drill, the combination comprising: an elongated body member having a chamber extending longitudinally therein; a hammer piston having a head portion and a reduced diameter stem portion; said piston being reciprocable within said chamber for percussively actuating a striking bar by engagement of said stem*

*portion with said striking bar upon movement of said piston from a first portion of said chamber to a second portion of said chamber; first passageway means in said body member adapted to be connected to a fluid pressure source; second passageway means in said stem portion in constant open communication with said first passageway means during at least a major portion of the reciprocable travel of said piston; third passageway means in said body member openly communicating between said second passageway means and a piston impact portion of said chamber only when said piston is moving through said first portion of said chamber; and fourth passageway means in said body member openly communicating with said second passageway means and a piston retracting portion of said chamber only when said piston is moving through said second portion of said chamber.*

*12. A rock drill as specified in claim 11 wherein said second passageway means is cyclically indexable with respect to adjacent portions of said third and fourth passageway means.*

*13. A rock drill as specified in claim 12 wherein said body member includes a bore therein coaxially aligned with said chamber and said stem portion is slidably received within said bore.*

*14. A rock drill as specified in claim 13 wherein such indexing occurs within said bore.*

* * * * *